United States Patent [19]

Blatt

[11] Patent Number: 4,650,234

[45] Date of Patent: Mar. 17, 1987

[54] TRANSFER BOOM ASSEMBLY FOR WORKPIECES

[76] Inventor: L. Douglas Blatt, 31915 Groesbeck Hwy., Fraser, Mich. 48026

[21] Appl. No.: 793,199

[22] Filed: Oct. 31, 1985

[51] Int. Cl.$^4$ .............................................. B23Q 7/04
[52] U.S. Cl. ...................................... 294/65; 414/752
[58] Field of Search ...................... 294/65, 64.1, 64.2; 414/749, 751, 752, 753; 901/22, 40; 198/486

[56] References Cited

U.S. PATENT DOCUMENTS

| | | | |
|---|---|---|---|
| 3,130,528 | 4/1964 | Andersen | 294/65 |
| 3,139,300 | 6/1964 | Hirt | 294/65 |
| 4,411,574 | 10/1983 | Riley | 294/65 |
| 4,543,034 | 9/1985 | Blatt et al. | 414/752 |

*Primary Examiner*—James B. Marbert
*Attorney, Agent, or Firm*—Cullen, Sloman, Cantor, Grauer, Scott, & Rutherford

[57] ABSTRACT

A transfer boom assembly for panel type workpieces adapted for suspension from a reciprocal shuttle carriage comprises an elongated boom arm of circular cross section having a plurality of continuous parallel passages formed within and along the length thereof. An air fitting is selectively connected to one end of at least one passage and connected by a conduit to an air control valve connected to a source of pressurized air. A plurality of variably spaced air fittings are connected to the arm along its length respectively in communication with at least one pressurized passage. A plurality of variably spaced vacuum boom mounts are adjustably mounted upon the boom arm adjacent the outlet fittings respectively. Each mount includes a clamp mounted on and secured to the boom arm. A spreader bar at one end is connected to each clamp and adjustably mounts along its length a venturi vacuum cup assembly for supporting registry with a workpiece. A series of conduits interconnect the fittings upon the boom arm and venturi cup assemblies.

19 Claims, 12 Drawing Figures

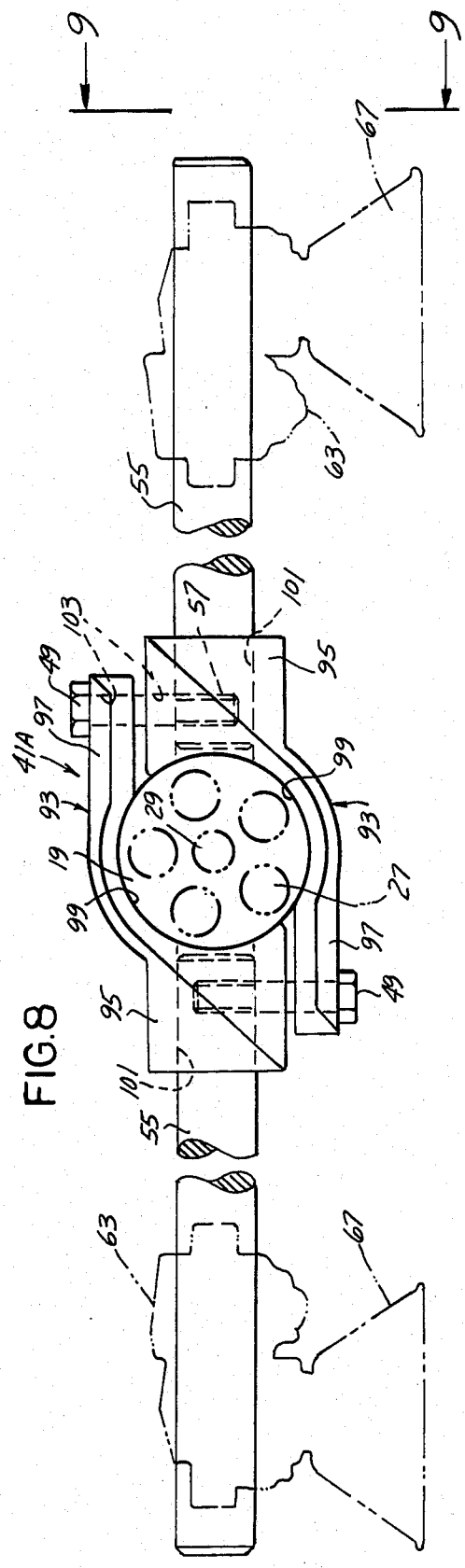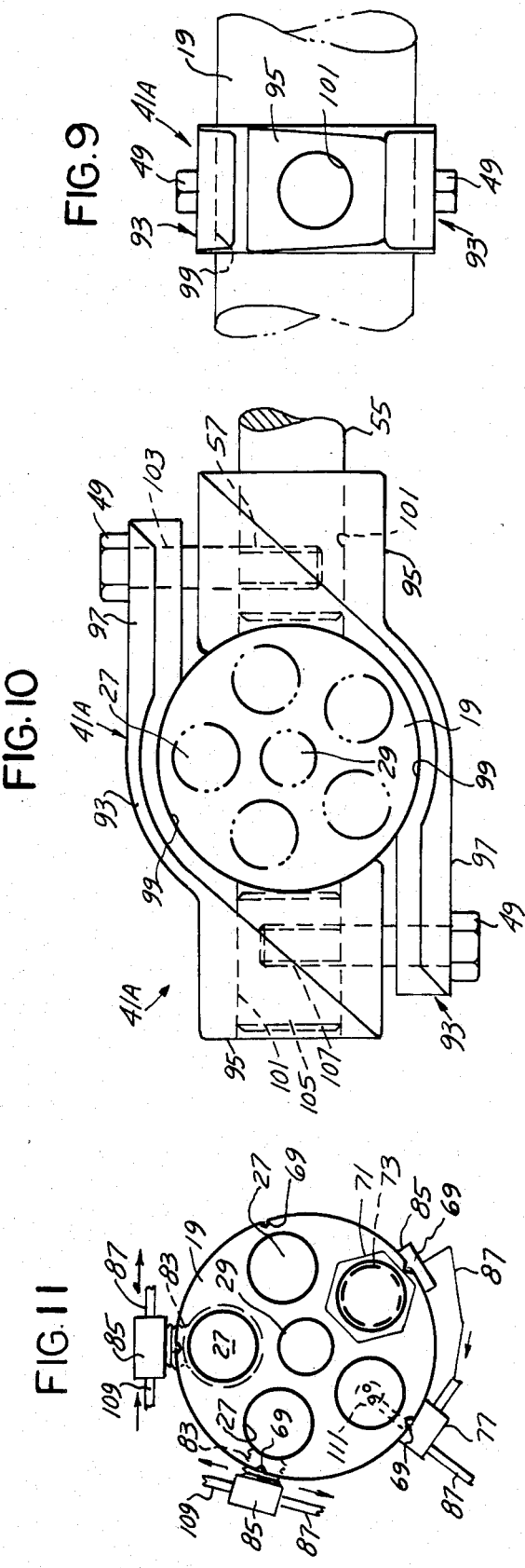

TRANSFER BOOM ASSEMBLY FOR WORKPIECES

FIELD OF INVENTION

In the manufacture of soft panels such as automotive quarter panels, roofs, decks, lids, etc, air fed venturis carrying vacuum cups are suspended from one or more boom arms extended from a reciprocating shuttle carriage for transporting the odd shaped panels from one press die operation and positioning them for pick-up and transfer to another dis operation.

BACKGROUND OF THE INVENTION

Heretofore, shuttle and transfer devices have used extension booms to reach into stamping or molding presses. The extension boom is attached to the travel carriage of the shuttle device. The boom is equipped with gripper or vacuum cups that engage and hold the workpiece to enable it to be carried to or removed rom the die area or work station. The grippers or vacuum cups are activated pneumatically, and or electrically. This requires them to be fed air or electrical current via exposed hoses or electrical wires.

These hoses and wires are constantly moving and flexing back and forth with the reciprocating travel stroke of the shuttle device. They must be installed with sufficient additional length to allow for the full travel stroke plus and additional loop or suspended coil to allow for flex to enable adequate wearlife. These exposed hoses and wires hanging and traveling in congested work areas are most vulnerable and frequently catch on tooling or gaging devices. They are often cut or pulled loose from their fittings, thus disabling the pick-up boom assembly and shutting dowm the production sequence until they are repaired.

THE PRIOR ART

Examples of a linear transfer boom for workpieces and cylinder operated feed mechanisms and venturi vacuum cup assemblies are set forth in one or more of the following United States Patents:
- U.S. Pat. No. 3,371,583, Mar. 5, 1968, Material Handling Device Actuator with Guide Rods
- U.S. Pat. No. 3,568,959, Mar. 9, 1971, Vacuum Cup Work Gripper
- U.S. Pat. No. 3,665,771, May 30, 1972, Retraction Mechanism for Shuttle Carriage
- U.S. Pat. No. 3,734,303, May 22, 1973, Travel Cylinder and Gripper Actuator with Triple Guide Rods
- U.S. Pat. No. 4,543,034 Sept. 24, 1985, Linear Tranfer Stroking Boom

SUMMARY OF THE INVENTION

The present transfer boom assembly replaces and eliminates the need for pneumatic hoses in the work area and provides complete concealment of any electrical wires. The boom arm is made from a custom extruded aluminum extrusion having a multiple hole pattern extruded throughout the length of the boom with the one ends of the passages plugged or otherwire closed.

It is an important feature of the present invention to provide protected passages within the boom arm for wires and hoses and wherein a plurality of outer passages arranged in a circle define the air passages and eliminate the need for hoses.

A further feature is to provide for the boom arm separate pneumatic functions which can be affected at any place along the extremity of the boom and wherein a plurality of outboard air fittings in a radial pattern can be selectively mounted upon the boom arm so that the boom arm functions as a plurality of inner passage and replaces previously used hose. The boom arm can provide concealed protected passage for electric wires.

Another feature is provide for one or more of the passages at their carriage mounted ends one or more fittings so that pressurized air through a short hose or hoses connected to one or more directional control valves supplies compressed air from an air compressor or other source to any one or more of the selected passages formed within and along the length of the boom arm.

A further feature includes a series of parallel longitudinally scribed indentations which are extruded into the boom arm during forming thereof which are located on the centerline of and radially outward of the respective extruded passages. This provides a means by which the user can locate, drill and tap a hole or holes at any points along the length of the boom using the scribed indentations lines as a guide to an adjacent pressurized passage. This allows connection at air fittings for feeding the vacuum venturi cups or grippers to be positioned at any location along the boom and outwardly thereof.

Another feature includes each or some of the air passages in the boom may be fed and controlled by a separate control valve supplying pressurized air to one or more vacuum or gripper devices.

A further feature includes the formation within the boom arm of an axial passage and radially outward thereof and in a circle a series of five independent air passages which may be separately sequenced pneumatically or electrically to any number of operational devices along the boom.

An important feature is to provide an improved vacuum boom mount adjustably mounted angularly upon and along the length of the boom and secured thereto and wherein there is included a two piece clamp with mating parts machined to receive portions of the boom for securing thereto.

Another feature includes a clamp including a pair of symmetrical opposed clamp bodies, each having a semicircular or semi-cylindrical inner surface adapted to be positioned over and around the boom arm and wherein fasteners are employed for interconnecting the clamp bodies.

As another feature, the respective clamp bodies include a socket within which is mounted the one end of a spreader bar and wherein upon each of the respective spreader bars along its length there is mounted and secured a venturi vacuum cup assembly.

A further feature includes individual short conduits circuits interconnecting each venturi assembly with a corresponding air fitting upon the boom arm, or for connecting one pressurized venturi assembly to an unpressurized venturi assembly.

These and other features and objects will be seen from the following specification and claims in conjunction with the appended drawings.

THE DRAWINGS

FIG. 3 is a transverse section taken in direction of arrows 3—3 of FIG. 1a.

FIG. 7 is an end view of the transfer boom assembly shown in FIG. 1a.

FIG. 8 is a fragmentary end view of one of the vacuum boom mounts shown in FIG. 1a and on an increased scale.

FIG. 9 is an end view taken in direction of arrows 9—9 of FIG. 8.

FIG. 10 is a fragmentary end view of a modified vacuum boom mount corresponding to FIG. 8.

FIG. 11 is a schematic end view of the boom arm shown in FIG. 1a illustrating selective air fittings upon one end of the air passages and selective air outlet or valve connector fittings arranged along the length of the boom arm shown in FIG. 1, on an increased scale.

It will be understood that the above drawings illustrate merely preferred embodiments of the invention and that other embodiments are contemplated within the scope of the claims hereafter set forth.

DETAILED DESCRIPTION OF AN EMBODIMENT OF THE INVENTION

Figure 1A:
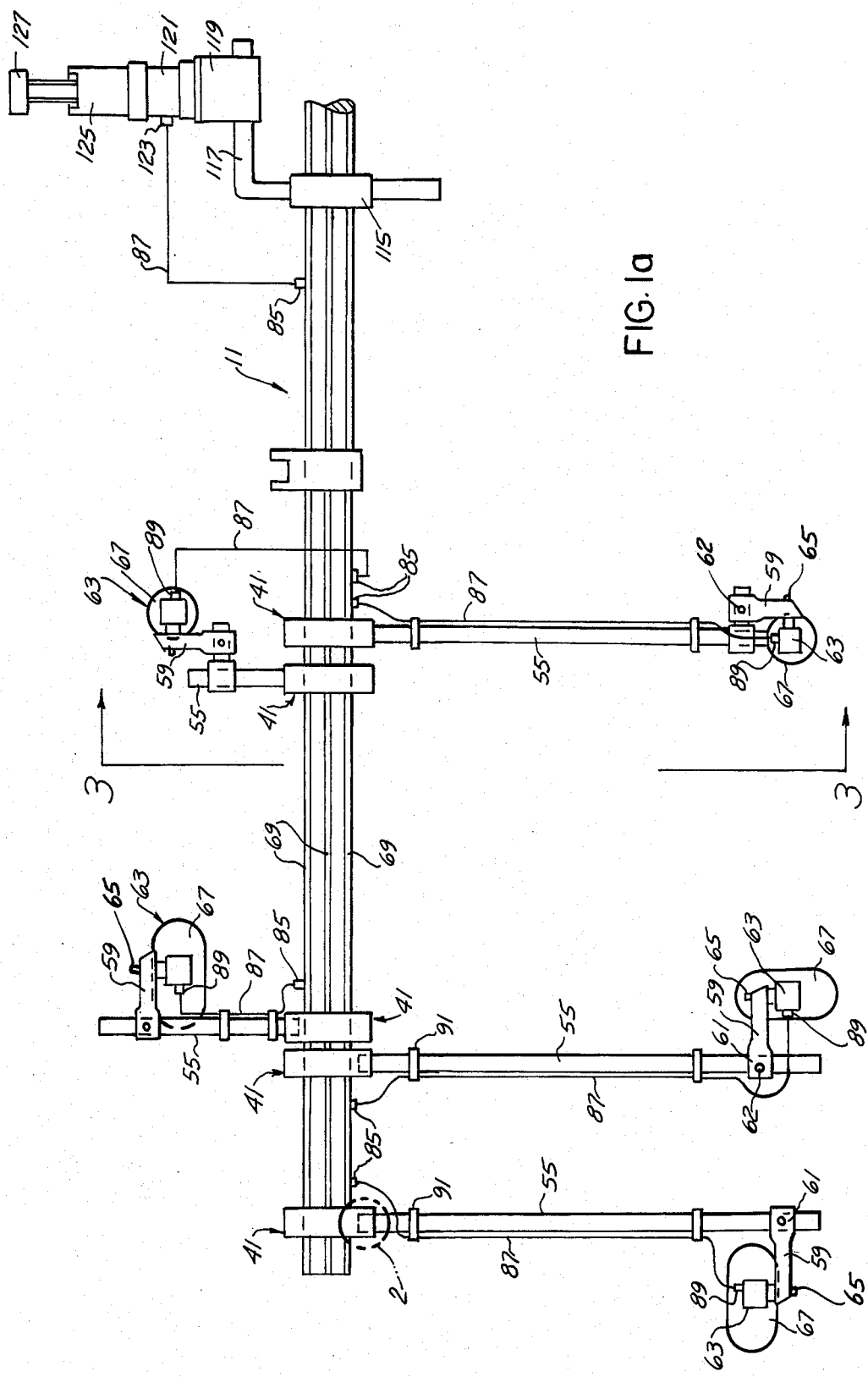
FIG. 1a is a schematic plan view of a forward portion of an illustrative transfer boom assembly for workpieces partly broken away suspended from reciprocal shuttle carriage schematically shown in FIG. 1b.
Figure 1B:
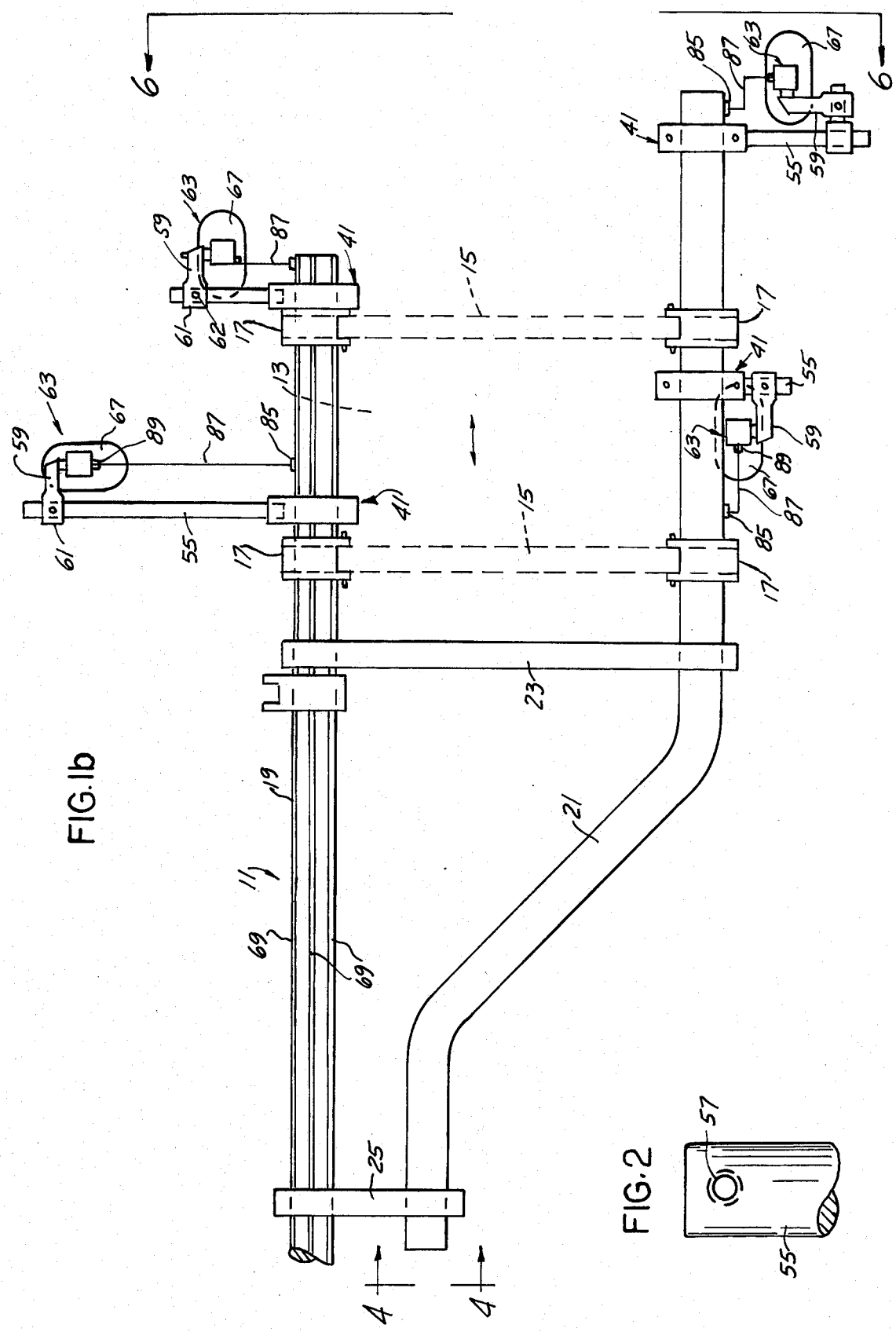
FIG. 1b is a similar view of a rear portion thereof.

Referring to the drawings, the present transfer boom assembly for workpieces is generally indicated in FIGS. 1a and 1b, and is related to Applicant's U.S. Pat. No. 4,543,034 dated Sept. 24, 1985.

The pressent transfer boom assembly is particularly adapted for soft panels, as for illustration, automotive quarter panels, roofs, deck lids, etc., hereafter referred to as a workpiece.

The present transfer boom assembly 11 is adapted for suspension from a reciprocal shuttle carriage schematically shown at 13 and reciprocal in the direction indicated by the arrow in FIG. 1b. The detail of the construction and operation of such reciprocal shuttle carriage is set forth in Applicant's U.S. Pat. No. 4,543,034 from which is suspended the present linear transfer stroking boom.

Generally stated the reciprocal shuttle carriage 13 includes at its opposite ends a pair of parallel spaced boom mount plates 15. In the illustrative embodiment the present extruded boom arms 19 and 21 are arranged upon opposite sides of the shuttle carriage and connected thereto by the corresponding mount brackets 17 secured upon the respective boom arms 19 and 21. Said brackets are removably mounted and secured upon the corresponding end portions of boom mount plates 15, as shown in detail in U.S. Pat. No. 4,543,034. To the extent the specific mounting of the boom arms upon a shuttle carriage is needed for an understanding of the present invention, the disclosure of said patent is incorporated herein by reference.

The present invention is primarily directed to a transfer boom assembly 11 for panel type workpieces adapted for suspension from such reciprocal carriage, schematically shown at 13, FIG. 1b.

Figure 4:
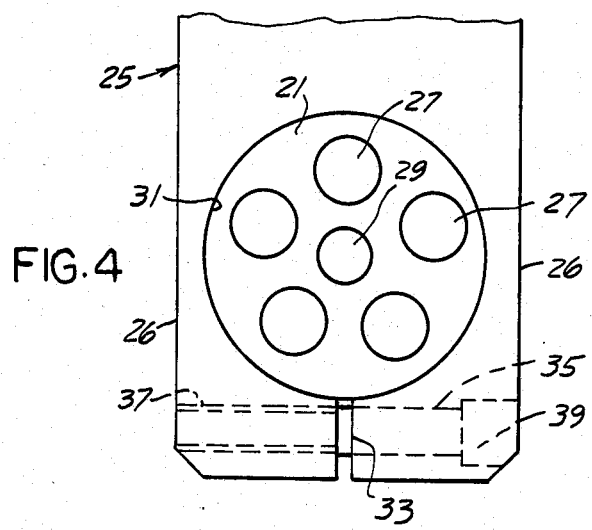
FIG. 4 is a fragmentary section taken in direction of arrows 4—4 of FIG. 1b.
Figure 5:
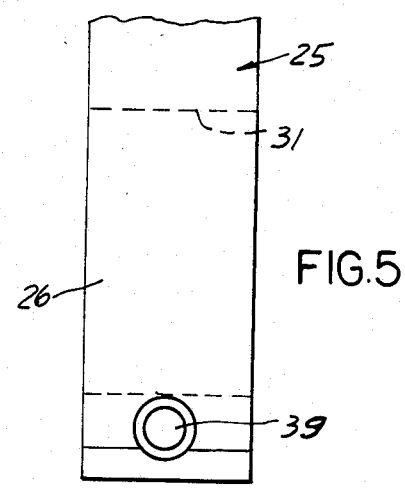
FIG. 5 is a fragmentary end view thereof.

The respective boom arms 19 and 21 are any desired predetermined shape and length are secured together by the longitudinally spaced spacer connectors 23 and 25, FIG. 1b, shown in further detail in FIGS. 4 and 5.

Formed within each of the boom arms 17 and 19 of extruded aluminum in the illustrative embodiment are a plurality of longitudinally extending continuous passages 27 of circular cross section and arranged in a circle, FIGS. 4 and 11. In the illustrative embodiment there are five passages having a diameter of one inch. Formed centrally and along the length of each of the boom arms 19 and 21 is a continuous central passage 29 with the respective five outer passages arranged radially outward therefrom around the circumference of the boom arm.

Referring to the spacer connectors 23 and 25 in the corresponding views in FIGS. 1b, 4 and 5, adjacent the end portions of such connectors 23 and 25 are depending end portions having semi-circular bores 31 and centrally outward thereof a radial split or cutaway slot 33 defining a pair of opposed partly flexible clamp elements 26.

A bore 35 extends transversely through one clamp element in registry with aligned tapped bore 37 in the other clamp element adapted to receive the socket headed cap screw or other fastener 39 to draw the clamp elements together against the boom arm. By this construction, the respective spacer connectors 23 and 25 receive portions of the corresponding boom arms 19 and 21 and are fixedly secured thereto in a rigid assembly.

A plurality of variably spaced, preferably forged, vaccum boom mounts 41 are selectively mounted upon and along the length of the respective boom arms. Each vacuum boom mount 41 includes a pair of opposed clamp bodies 43, FIG. 3, each having formed therein opposed semi-circular recesses 47 for angular positioning upon and around the respective boom arm and secured thereto by the cap screws or other fasteners 49, FIG. 3.

Figure 3:
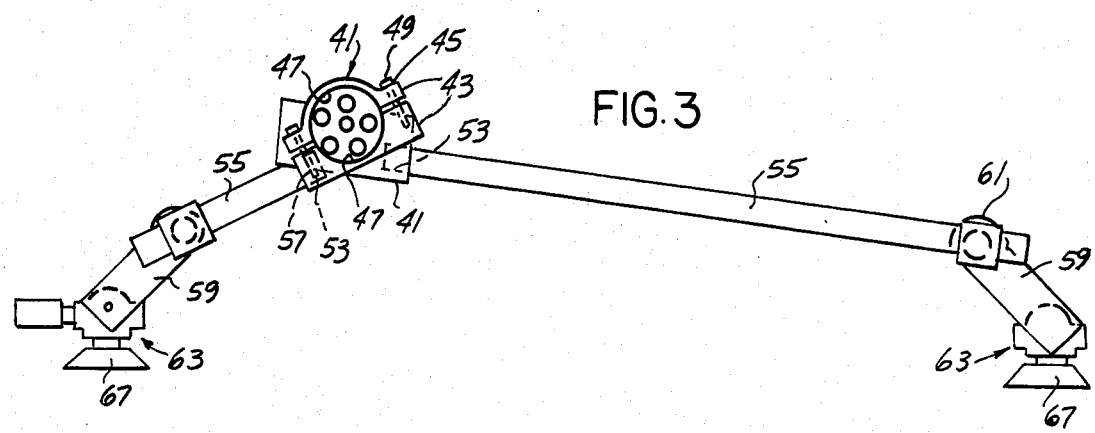

Formed within one of the clamp bodies 43 is a socket 53, FIG. 3, adapted to receive one end of spreader bar 55. One of the fasteners 49 for the clamp bodies 43 extends into tapped bore 57 in the spreader bar as shown on an enlarged scale in FIG. 8. Said fasteners function to secure the opposed clamp bodies 43 together and anchor the inner ends of the respective spreader bar upon one clamp body.

Adjustably mounted along the length of the respective spreader bars 55 is a venturi vacuum cup assembly 63 including venturi support arm 59, FIG. 1a, which includes collar 61 at one end. Said collar is adjustably mounted on and along the length of spreader bar 55, as is desired for registry with a surface area portion of a workpiece, and is suitably secured thereto by fasteners 62, FIG. 1a.

Venturi assembly 63 is adjustably mounted upon one end of support arm 59 and adjustably secured thereto as at 65. Suction cup 67, circular or oval in shape, and made of a flexible material such as rubber or plastic material, depends from the venturi assembly 63 in manner fully disclosed in U.S. Pat. No. 3,568,959 referred to above. The venturi assembly 63 is adapted to receive pressurized air and through a suitable venturi system creates a vacuum condition upon the interior of the suction cup 67 for registry with and supporting engagement with a workpiece.

The respective vacuum cups 67 are variably positioned and supported upon corresponding spreader bars 55 upon the respective boom arms 19 and 21 such as will be adapted to engage spaced surface portions of the workpiece to be supported by the present boom arm assembly.

The disclosure in Blatt U.S. Pat. No. 3,568,959 to the extent necessary for an understanding of the function and operation of the present venturi assembly 63 and vacuum cup 67, is incorporated by reference herein. For the purpose of the present disclosure it is sufficient to understand that pressurized air delivered to the venturi assembly 63 provides a means of establishing vacuum upon the interior of the respective vacuum cups 67.

Formed along the length of the respective boom arms 19 and 21 as a part of the extrusion thereof are a series of parallel spaced scribed fitting location grooves 69, FIG. 11, which are arranged radially outward of the corresponding passages 27. In the illustrative embodiment the fitting locating scribed grooves are 1/32 of an inch deep and have an included angle up to 90°, for illustration.

Figure 6:
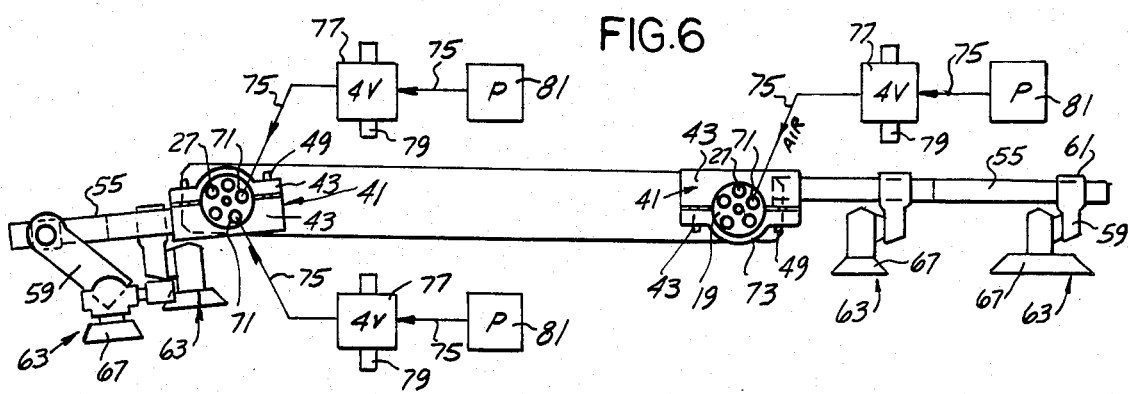
FIG. 6 is an end view taken in direction of arrows 6—6 of FIG. 1b.

Each of the passages 27, at the shuttle end of the boom arms 19 and 21 is tapped at 73, to receive pipe fitting 71 for one end of air line or conduit 75, schematically shown in FIG. 6. Said conduit is connected to an outlet port of the three way or four way valve 77 having suitable electrical controls at 79 and receiving pressurized air in conduit 75 from a pressurized air source 81 which may be a compressor or a pressurized air tank. The function and operation of the control valve assembly is set forth in one or more of the above identified patents by which pressurized air as desired and under a remote control is fed through pipe 75 to the inlet fitting 71 of one or more of the passages 27.

In the illustrative embodiment, FIG. 6, there are provided a pair of control valves 77 adapted for supplying pressurized air to a pair of the arm passages 27 of boom arm 21 and an additional control valve for boom arm 19.

Referring to FIG. 11 and FIG. 1, there are variably located as desired a series of tapped radial bores 83 using the corresponding passage locating scribed indentations 69. Into each of the preselected and prelocated tapped radial outlets 83 there is mounted an air fitting block 85 which on its interior communicates with the adjacent air passage 27. Similar fittings may be connected to any pressurized passage.

Each of the respective venturi assemblies 63, in the manner set forth in U.S. Pat. No. 3,568,959, has a fitting 89, FIG. 1a, adapted to receive one end of the short flexible conduit 87. The other ends of the respective air conduits are connected to the corresponding air outlet fittings 85 as shown in FIGS. 1 and 11. Mounted upon and interconnecting the corresponding spreader bars 55 and adjacent conduits 87 are a series of longitudinally spaced air hose anchor clips 91.

FIGS. 8, 9 and 10 illustrate a modified, preferably forged, vacuum boom mount 41a corresponding to the vacuum boom mounts 41 shown in FIG. 1. Said vacuum boom mounts include a pair of opposed symmetrical clamp bodies 93. Each clamp element has at one end body 95 terminating in an arm 97. Formed within the respective clamp elements are a pair of opposed semicircular recesses 99.

Figure 2:
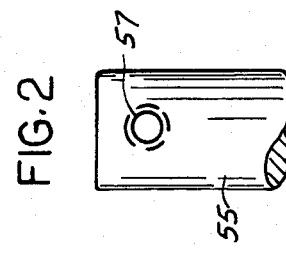
FIG. 2 is a partly broken away plan view of a portion of a spreader arm designated by inset 2 in FIG. 1a, on an increased scale.

The respective clamp elements or clamp bodies 93 are angularly positioned upon and around a corresponding boom arm 19 or 21 are secured thereto by the transverse oppositely directed cap screws or other fasteners 49. In the embodiment shown in FIG. 8, formed within the respective clamp bodies 95 are opposed aligned sockets 101 adapted to receive the inner ends of a pair of aligned opposed spreader bars 55, fragmentarily shown. The respective fasteners 49 extend through transverse bores 103 in the respective arms 97 and are threaded into tapped transverse bores 57 adjacent the one ends of the spreader bars 55, FIGS. 2 and 8.

In the modified vacuum mount 41a, FIG. 10, only one of the clamp body sockets 101 receives a spreader bar 55 secured to both of the opposed clamp elements by fastener 49. In this embodiment, the other opposed and aligned socket 101 has a plug 105 nested therein and anchored by the transverse additional fastener 49 which extends through and end portion of clamp body arm 97 and through a corresponding radial tapped bore 107 in said plug. This provides a means for anchoring the spreader bar 55 and at the same time effectively secures the pair of symmetrical clamp elements 93 to each other and upon and adjustably around the corresponding boom arm 19.

Referring to FIGS. 1 and 11, the upper laterally located air passage 27 has been pressurized. A suitable fitting 71 is connected to one end of passage 27 for connection to a control valve 77 and source of pressurized air 81 for delivering pressurized air to fitting 85. Pressurized air is fed through conduit 87 to fitting 89 on one of the venturi vacuum cup assemblies 63. In the event that there is second spreader bar 55 mounted upon the boom arm 19 extending in a different direction therefrom there is provided second air fitting 85 threaded into said boom arm at the top of FIG. 11. Said fitting has a flexible conduit 87 connected to an additional venturi vacuum cup mounting 63.

Here the respective fitting 85 is radially threaded at 83 as at one of the scribed indentations 69 into the arm 19, but in communication with the a nonpressurized passage 27. In this case, a second vacuum mount venturi assembly 63 receives pressurized air from a first conduit 87 and through the connecting conduit 109. Thus some of the pressurized air from a first vacuum mount goes to the second fitting 85 which is in registry with a nonpressurized passage 27.

One of the passages 27 may be used for protectively enclosing suitable electrical connector wires 111, FIG. 11, connected to a suitable controlable power source, not shown. Said wires extend through one passage 27 along the length of the boom arm to the fitting 83 into which is mounted a three way or four way valve 77 threaded thereinto and schematically shown. Said four way valve whether open or closed is controlled by the electrical connector wires 111. Said valve includes an outlet receiving one end of flexible conduit 87, fragmentarily shown, adapted for connection to one or more venturi vacuum cup assemblies 63.

Figure 7:
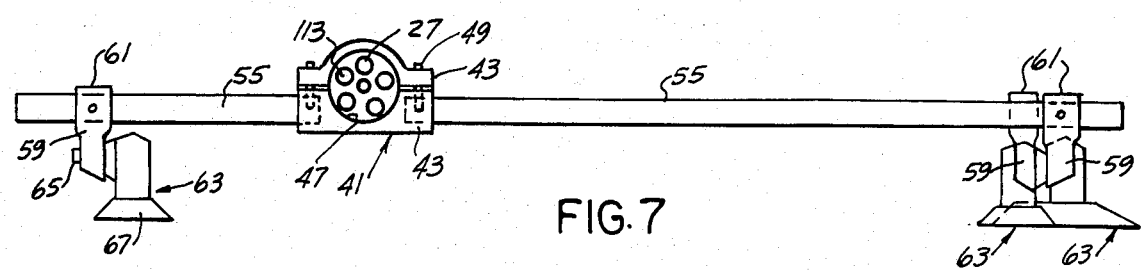

The pressurized air is directed to four way valve 77 from an adjacent pressurized passage 27, through a conduit 87 which is connected to fitting 85 FIG. 11. This provides a means for supplying pressurized air through one passage 27 and conduit 87 connected to control valve 77. Said valve is electrically controlled by the connector wires 111 for regulating the flow of pressurized air through the conduit 87 to one of the vacuum cup venturi assemblies 63. As shown in FIG. 7 one or both ends of the central passage 29 is closed by a plug 113.

The use of the present selectively pressurized passges 27 along the length of the boom arms 19 and 21 provides a means for eliminating conventional hoses and electrical connections which would otherwise dangle from a standard pipe boom.

An important function of the scribed location indentations 69, FIG. 11, is to provide a location for a tap that may be required anywhere along the length of the tube to fit a particular air operated device for communication with one pressurized passage 27.

The boom assembly shown in FIG. 1 is connected to a recirprocal shuttle carriage 13 for moving a rather large awkward automotive panel type workpiece for illustration.

There is noted the absence of the air pipes and electrical lines along the length of the boom arm as they are fed pressurized air or enclose wires through the corresponding several passages 27. In the illustrative embodiment there are five such passages 27. Thus there may be provided five separate pneumatic functions that can be affected at any place along the extremity of the boom arm. Each of the outboard apertures 27 with corresponding fittings in a radial pattern function as air passages replacing the conventional hose or can provide concealed protected passage for electrical wires 111.

All that is required are the respective short hoses or flexible conduits 87, FIG. 1, through which pressurized air is fed from a preselected pressurized passage 27 to one or more vacuum venturi suction cup assemblies 63.

In use each of the extruded passages 27 may be tapped at one end 73 to receive a fitting 71 to supply one or more vacuum or gripper devices adjustably mounted and secured upon corresponding spreader bars mounted upon either of the boom arms. In the present illustrative embodiment, the respective booms can feed separately sequenced pneumatic or electrical to any number of operational devices mounted along the boom up to five sequences if desired. In that case the respective corresponding control valves, FIG. 6, may be variably controlled in accordance with a predetermined sequence. It is contemplated in most situations, however, that one or more of the respective air passages 27 may be controlled for operation in unison for effectively gripping an underlying workpiece by the respective vacuum cup assemblies.

Instead of a vacuum cup assembly as at 67, there may be employed one or more gripper heads 125, FIG. 1a, mounted upon the boom arm 19 for operatively engaging a portion of a workpiece. Hanger bracket 115 is adjustably mounted over boom arm 19 and adjustably receives therethrough hanger rod 117. The hanger rod adjustably mounts the hanger rod mount 119 supporting air cylinder 21 having one or more air fittings 123. Gripper head 125 is mounted upon the air cylinder at one end and includes a pair of opposed jaws 127.

Pressurized air from one of the passages 27 through fitting 85 and conduit 87 connects the cylinder fitting 123 for pressurizing said cylinder as desired for closing jaws 127. Pressure fitting 85 may be supplied by a separate four way valve 77 as shown in FIG. 6, through a conduit 75 from pressure source 81. This may be mounted upon carriage 13 or alternately could be mounted directly upon the boom arm 19 as shown at 77 in FIG. 11. The control valve 77, such as controlled by wires 111, regulates the flow of pressurized air through the conduit 87 to the fitting 123 upon cylinder 121 for closing the jaws 127 with respect to a workpiece. Upon release of pressure, spring means or otherwise may be employed for opening the jaws. The construction of the gripper is set forth in one or more of the patents listed in this specification.

Having described my invention, reference should now be had to the following claims.

I claim:

1. In a transfer boom assembly for panel type workpieces, adapted for suspension from a reciprocal shuttle carriage;

an elongated boom arm of predetermined shape and circular in cross section;

there being a plurality of continuous parallel passages of uniform diameter formed within and along the length of said arm;

pressure air inlet fittings selectively connected to the one ends of said passages;

a control valve having an air outlet connected by a conduit to a first inlet fitting for one passage, and to a source of pressurized air;

the other ends of said passages being closed;

said arm adapted to selectively receive a plurality of spaced air outlet fittings adjacent one passage;

a plurality of pressure air outlet fittings connected to said arm at spaced points along its length, respectively in communication with one passage;

a plurality of variably spaced vacuum boom arm mounts overlying and secured upon said boom arm adjacent said outlet fittings respectively;

each boom arm mount including a clamp receiving said boom arm and secured thereto;

a spreader bar at one end connected to each clamp;

a venturi vacuum cup assembly adjustably mounted and secured upon said spreader bar selectively along its length, including a flexible vacuum cup adapted for supporting registry with said workpiece;

and flexible conduits interconnecting arm outlet fittings and adjacent venturi cup assemblies, respectively.

2. In the boom assembly of claim 1, a series of parallel spaced passage locating scribed line indentations in and along the outer surface of said boom arm adjacent and radially outward of the respective passages therein, to facilitate locating, drilling and mounting of preselected pressure air outlets for communication with corresponding pressurized passages.

3. In the boom assembly of claim 1, said boom arm being of aluminum, said arm and passages being formed as an extrusion.

4. In the boom arm assembly of claim 3, a plug inserted in and closing the one ends of each of said passages.

5. In the boom assembly of claim 1, a second flexible conduit interconnecting a pressurized venturi vacuum cup assembly and another non pressurized venturi cup assembly spaced therefrom for pressurizing said other venturi cup assembly from said one passage.

6. In the boom assembly of claim 1, the other passages being adapted for selective air pressurization;

a control valve having an outlet connected to any other selected passage and to a source of pressurized air, some of said air outlet fittings being mounted upon said boom arm in communication with any other selected air passage whereby different sequences of operation of the venturi cup assemblies up to five sequences may be effected.

7. In the boom assembly of claim 1, the clamp of each of said vacuum boom arm mounts including a pair of opposed clamp bodies having internal semi-circular recesses snugly receiving said boom arm;

and a pair of fasteners interconnecting said clamp bodies in compression, whereby the clamp is angularly adjustable relative to the boom arm and secured thereto.

8. In the boom assembly of claim 7, one of said clamp bodies having a radial socket, each spreader bar at said one end axially extending into said socket;

one of said clamp fasteners extending radially through and threaded into a corresponding bore in said spreader bar immovably anchoring said spreader bar upon said clamp.

9. In the boom assembly of claim 7, one of said clamp bodies having a pair of aligned opposed outwardly opening sockets;

the one ends of a pair of opposed spreader bars extending into said sockets respectively, said clamp fasteners extending radially through and threaded into corresponding bores in said spreader bars for anchoring said bars upon said clamp.

10. In the boom assembly of claim 7, said clamp bodies being symmetrical, each of said clamp bodies having a radial socket;

one spreader bar at its one end extending into one of said sockets;

a cylindrical plug extending into the other socket;

said fasteners extending in opposite directions into said clamp bodies and threaded into radial bores and the end of said spreader bar and in said plug.

11. In the boom assembly of claim 7, said clamp bodies being symmetrical, each of said clamp bodies having a radial socket, a pair of opposed spreader bars at their one ends extending into said sockets;

said fasteners extending in opposite directions into said clamp bodies and threaded into radial bores in said spreader bars respectively.

12. In the transfer boom assembly of claim 1, the mounting of each venturi cup assembly including a venturi support arm at one end having a collar slidably mounted upon a spreader bar and secured thereto;

a venturi assembly adjustably mounted upon the other end of said support arm and having an air inlet fitting;

and a vacuum cup depending from the venturi assembly.

13. In the transfer boom assembly of claim 1, a second boom arm spaced from said first boom arm, adapted for connection to said shuttle carriage;

said second boom arm being of the same construction as said first boom arm and rigidly connected thereto;

said connection including a pair of parallel spaced spacer connectors extending between and at their ends rigidly connected to said boom arms.

14. In the transfer boom assembly of claim 13, said second boom arm having selectively pressurized air passages therethrough, corresponding air inlet fittings for each pressurized passage with a corresponding control valve connected thereto and to a source of pressurized air;

there being a series of longitudinally and variably spaced air outlet fittings mounted upon said second boom arm in communication with at least one pressurized passage therein, and a plurality of spaced selectively located vacuum boom arm mounts secured upon said second boom arm.

15. In the boom assembly of claim 13, said spacer connectors having depending portions adjacent their ends which include opposed semicircular recesses terminating in and outwardly opening radial slot defining a pair of boom arm clamp members;

said recesses receiving and surrounding said booms;

and a fastener interconnecting said clamp members in compression.

16. In the transfer boom of claim 1, said boom arm having five independent passages, adapted to selectively receive pressurized air and an electrical control wire therein.

17. In the boom assembly of claim 1, at least one air operated workpiece gripper having an air fitting adjustably mounted and secured upon a spreader bar;

an electrically operated air control valve mounted upon one of said outlet fittings upon said boom arm and connected to pressurized air in one of said passages;

an electrical conductor wires extending through one of said air passages and outwardly of one outlet fitting, at one end connected to said control valve and at its other end connected to an electrically controlled power source;

and a conduit interconnecting said control valve and said gripper fitting.

18. In the boom assembly of claim 1, said boom arm having a central axial passage throughout its length.

19. In the boom assembly of claim 1, a plurality of longitudinally spaced clips interconnecting a spreader bar and adjacent air conduit.

* * * * *